United States Patent [19]

Broadway et al.

[11] 4,338,534

[45] Jul. 6, 1982

[54] POLE-AMPLITUDE MODULATION, POLE-CHANGING ELECTRIC MOTORS AND GENERATORS

[75] Inventors: Alexander R. W. Broadway, Bristol, England; Gordon H. Rawcliffe, deceased, late of Bristol, England, by Sheila M. Rawcliffe, executrix; by Caroline S. Rawcliffe, executrix, Norwich, England

[73] Assignee: National Research Development Corporation, London, England

[21] Appl. No.: 138,533

[22] Filed: Apr. 9, 1980

[30] Foreign Application Priority Data

May 3, 1979 [GB] United Kingdom .................. 7915458

[51] Int. Cl.³ ............................................. H02K 3/00
[52] U.S. Cl. .................................... 310/184; 310/198; 318/773
[58] Field of Search ............... 310/180, 184, 198, 208; 318/773; 322/90

[56] References Cited

U.S. PATENT DOCUMENTS

| 3,070,734 | 12/1962 | Rawcliffe | 318/773 |
| 4,075,543 | 2/1978 | Uyen | 318/773 |
| 4,138,619 | 2/1979 | Broadway | 310/184 |
| 4,144,470 | 3/1979 | Avinger | 318/773 |

Primary Examiner—R. Skudy
Attorney, Agent, or Firm—Larson & Taylor

[57] ABSTRACT

A pole-amplitude modulation (P.A.M.) three-phase, pole-number changing machine having star-connected and delta-connected stator winding components, thereby providing additional means for reducing m.m.f. harmonics in the resultant three-phase field. Pole-number changing is effected by reversing the star-connected winding component relatively to the delta-connected component.

A design method defines relationships between alternative pole-numbers and stator slot number, and slot-spacing between star- and delta-connected components.

6 Claims, 4 Drawing Figures

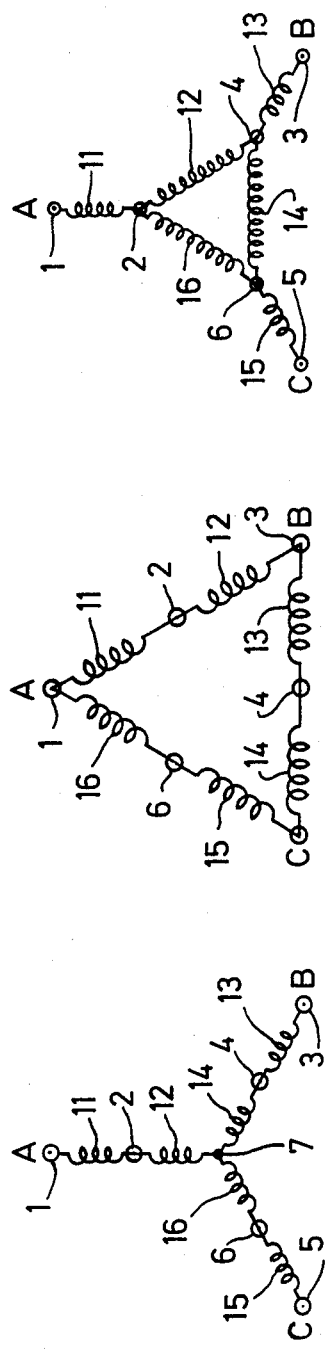

POLE-AMPLITUDE MODULATION, POLE-CHANGING ELECTRIC MOTORS AND GENERATORS

DESCRIPTION OF THE INVENTION

Introduction

This invention relates to stator windings for pole-amplitude modulation (P.A.M.) pole-changing electric machines,, either speed-changing motors or pole-changing generators.

The object of the invention is to provide a method for reducing the harmonic content of the magnetomotive force field produced by a P.A.M. winding which is an alternative method to the methods already known for such purpose. The object is further to provide P.A.M. windings wherein the harmonic content of the m.m.f. field is reduced by such method.

Accordingly, one form of the invention provides a pole-amplitude modulation, pole-number changing electric machine having a three-phase stator winding comprising three phase-winding sections in delta connection and three other phase-winding sections in star connection, coils or coil-groups of the delta-connected phase-windings and coils or coil-groups of the star-connected phase-windings following each other regularly and alternately around the winding periphery and pole-amplitude modulation of the combined stator winding being effected by reversal, in current-carrying sense of the series-connected phase windings relatively to the delta-connected phase-windings.

Another form of the invention provides a method for designing a pole-amplitude modulation, pole-number changing electric machine having a three-phase stator winding comprising star-connected and delta-connected winding sections, including the steps of:

Selecting a slot-number "S" for a three-phase winding element where S=12 slots or a multiple thereof;

Selecting a pole-number "P1" for the first of the alternative pole-numbers required;

Designing a first three-phase winding for P1-poles in ½S slots;

Designing a second and similar three-phase winding for P1-poles in ½S slots having coils with substantially $1/\sqrt{3}$ times the number of turns and conductors of substantially $\sqrt{3}$ times the cross-section area of the coils of the first winding;

Combining the first and second said windings in the S slots of the winding element using a phase band of each winding in a regular and alternate sequence throughout the winding section;

Ensuring that the slot-spacing of corresponding phase-bands of the first and second windings corresponds substantially to 30° electrical spacing at the first pole-number, P1;

Selecting one pole-number from the alternatives P1+S and P1−S to be the second alternative pole-number;

Selecting a stator slot-number equal to NS slots, where N is a small even integer;

Combining ½N pairs of said winding elements in the NS slots of the stator with such slot-spacing that the m.m.f. component of either (P1+S)-poles or (P1−S)-poles, whichever one was not selected for the second alternative pole-number, is most completely eliminated;

Selecting a coil-pitch for the combined winding;

Connecting the said first three phase-windings in delta-connection and connecting the second three phase-windings, at one end of each, to the delta terminals of the first windings;

Providing six control leads from the delta terminals and the other ends of the second windings for providing parallel-(star/delta) and series-(star/delta) switching of the combined stator winding for providing said first pole-number and said second pole-number, respectively.

In order that the invention may be fully understood and readily carried into practice, the method of the invention and two embodiments of P.A.M. stator windings designed according to the method will now be described in detail, the embodiments by way of example, with reference to the accompanying drawings.

SHORT DESCRIPTION OF THE DRAWINGS

FIG. 1 shows a series of three switching diagrams for three-phase P.A.M. stator windings, showing
 (a) parallel-star/series-star, known in the prior art;
 (b) parallel-star/series-delta, known in the prior art; and
 (c) parallel-(star/delta)/series-(star/delta) alternative connections, in accordance with the invention as described herein;

FIG. 2 is a slot diagram showing a 12-slot winding element;

DESCRIPTION OF THE METHOD AND EXAMPLES

Figure 3:
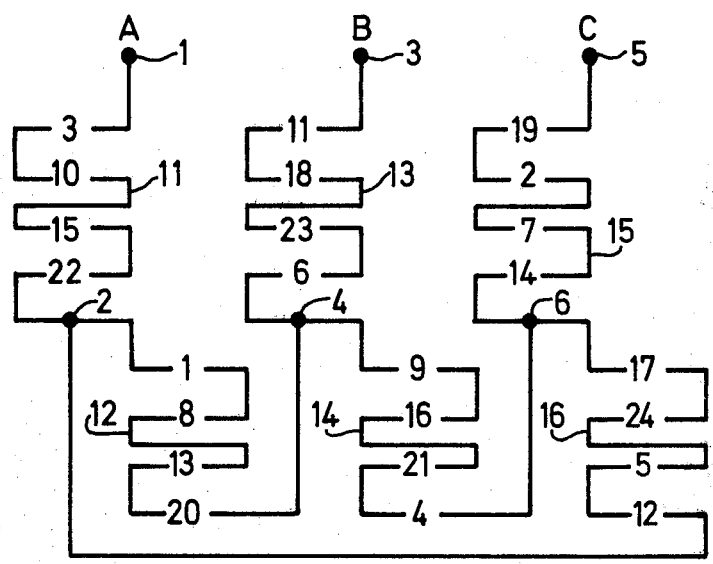
FIG. 3 is a winding diagram of a three-phase, 2-pole/10-pole, P.A.M. winding in 24 slots.

In the design of stator windings for three-phase electric motors, two standard single-speed, three-phase component windings, one connected in delta and the other in star, can be supplied in parallel. For such connection, the e.m.f.'s in the two parts must be in correct relative phase, that is displaced by substantially 30° electrical, and the effective numbers of turns per phase in the two windings should be substantially in the ratio $\sqrt{3}$ to 1 for the delta and star sections, respectively. Such a paralleling arrangement has been used to reduce the harmonic content of a single-speed winding.

It has now been found that a delta/star winding arrangement, with substantially 30° phase shift, can be used with advantage for P.A.M. electric machines.

FIG. 1 shows at (a), (b) and (c) three different three-phase P.A.M. windings with switching for changing the pole-number. All three arrangements show a phase-winding section 11 with an end terminal 1 joined at a terminal 2 to a phase-winding section 12, a phase-winding section 13 with an end terminal 3 joined at a terminal 4 to a phase-winding section 14 and a phase-winding section 15 with an end terminal 5 joined at a terminal 6 to a phase-winding section 16.

For all three arrangements of FIG. 1 (a), (b) and (c), a first pole-number is provided by supplying terminals 2, 4 and 6 from phases A, B and C, respectively and joining together terminals 1, 3 and 5. The second pole-number is provided by supplying terminals 1, 3 and 5 from phases A, B and C, and by isolating terminals 2, 4 and 6.

FIG. 1 (a) is a parallel-star/series-star switching arrangement and shows the series-star arrangement;

FIG. 1 (b) is a parallel-star/series-delta switching arrangement and shows the series-delta arrangement; and FIG. 1 (c) is a parallel-(star/delta)/series-(star/delta) switching arrangement and shows the series (star-delta) arrangement.

It will be noted that six control leads, from terminals 1-6, are required for each switching arrangement.

FIG. 1 (a) and FIG. 1 (b) are known winding and switching arrangements. FIG. 1 (c) shows the new winding and switching arrangement required by the present invention.

In the arrangements of FIG. 1 (a) and FIG. 1 (b), all phase-winding sections 11-16 are identical as regards the number of turns per coil and conductor cross-section area.

In the star-delta arrangement of FIG. 1 (c), the star-connected coils must of course carry a current which is greater than the current carried by the delta-connected coils, substantially in the ratio of $\sqrt{3}$ to 1. However, the turns of the star-connected coils must be fewer in number, substantially by the factor $1/\sqrt{3}$ times the turns of the delta-connected coils, in order to permit parallel connection of the star-connected and the delta-connected windings. Correspondingly, the conductor cross-section area for the star-connected coils is greater, substantially by the factor $\sqrt{3}$ times the conductor area of the delta-connected coils. In consequence, the $I^2R$ heating loss is the same for both star-connected and delta-connected coils. All coils will be of the same physical size and all stator slots will be fully filled.

Thus, in FIG. 1 (c), the phase-winding sections 11, 13 and 15 have approximately $1/\sqrt{3}$ times the number of turns of the phase-winding sections 12, 14 and 16. The phase-winding sections 11, 13 and 15 have a conductor cross-section area approximately $\sqrt{3}$ times the conductor area of the phase-winding sections 12, 14 and 16, the said approximations being within the normal design tolerances for rotary electrical machines.

Two examples of windings according to FIG. 1 (c) are described below. A 2-pole/10-pole winding is described with reference to FIGS. 2 and 3 and a 2-pole/14-pole winding is described with reference to FIGS. 2 and 4.

Notwithstanding the 2-pole/10-pole and 2-pole/14-pole examples chosen, the arrangement of FIG. 1 (c) is quite general, in that it may be applied to windings for any P.A.M. pole-numbers. However, it provides particular advantages for pole-combinations which are both odd numbers of pole-pairs.

It is unnecessary for the star and delta parts of the arrangement, sections 11, 13 and 15 and sections 12, 14 and 16, respectively, to be separately designed for P.A.M. pole-changing, by the customary series/parallel switching, because the star and delta winding components are themselves switched in a series/parallel manner. This switching provides P.A.M. pole-number changing and requires six switching terminals, terminals 1-6, as is always the minimum number required for P.A.M. switching.

THE METHOD OF THE INVENTION

Before describing the two examples, the design method of the invention will be described, first with reference to FIG. 2.

FIG. 2 shows a three-phase winding element in a submultiple of the slots chosen for the stator frame. In this example, the element is a 12-slot element, this being appropriate to the examples of FIG. 3 and FIG. 4.

FIG. 2 shows at line (i) the slot numbers 1-12. At line (ii) is shown the simplest possible balanced, three-phase winding. This is a 2-pole winding and is placed in the even-numbered slots of the 12-slot element. At line (iii) is shown a duplicate of the line (ii) three-phase winding placed in slot 1 and the remaining odd-numbered slots.

Figure 4:
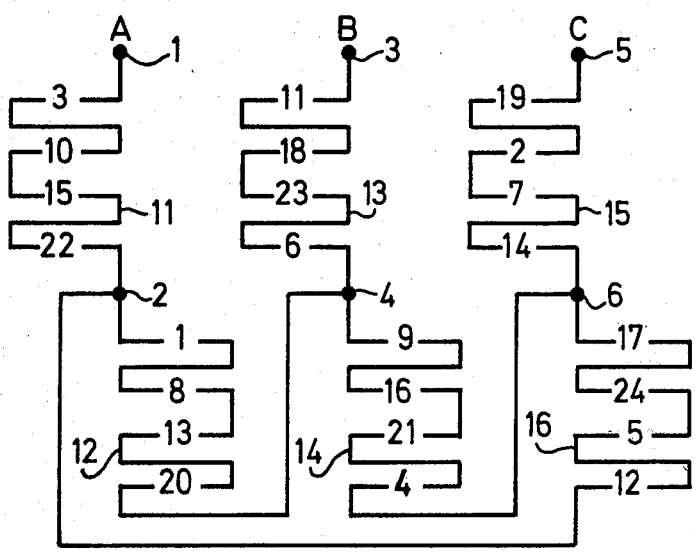
FIG. 4 is a winding diagram of a three-phase, 2-pole/14-pole, P.A.M. winding in 24 slots.

Since both three-phase windings must each occupy 6 slots minimum, it is evident that the minimum winding element must occupy 12 slots. The stator slot-number will later be seen to be an even multiple of 12 slots. Both stators of FIGS. 3 and 4 are 24 slots.

Each three-phase winding occupies one-half of the total number of slots, but need not necessarily occupy alternate slots as shown in the FIG. 2 example. Using a multiple of 12 slots element, the two windings may occupy alternate pairs of slots or be in some other regular and alternate sequence.

It is supposed that the winding of line (ii) will be connected in star and the winding of line (iii) will be connected in delta. Thus, as explained with reference to FIG. 1 (c), the coils of the winding of line (ii) have $1/\sqrt{3}$ times the number of turns of the coils of the winding of line (iii). The coils of the winding of line (ii) have $\sqrt{3}$ times the conductor cross-section area as the coils of the winding of line (iii).

FIG. 2 line (iv) shows the resultant distribution of coils of the combined stator winding.

The two groups of three phase-windings are connected together as was shown in FIG. 1 (c) in order to provide alternative parallel-(star/delta) and series-(star/delta) connections. It is to be noted that the star-connected phase-winding sections are reversed in current-carrying sense in the alternative parallel and series connections.

Referring to FIG. 2 line (iv) it will be seen that six alternate phase-winding sections are reversed in the alternative connections. This corresponds to a 12-pole overall modulating wave for the purpose of pole-amplitude modulation. This modulating wave is shown at (v) in FIG. 2.

Accordingly, by P.A.M. theory, if the first pole-number $P_1$, the second pole number $P_2$ is given by:

$$P_2 = P_1 + 12$$

or $$P_2 = P_1 - 12$$

Thus, with the 2-pole, 12-slot winding element of FIG. 2, the modulated pole-number is either (+) 14 poles or (−) 10 poles.

FIG. 3 shows the 2-pole/10-pole case and FIG. 4 shows the 2-pole/14-pole case.

One of the alternative connections, usually the lower of the alternative pole-numbers, is a parallel connection of the star-connected and delta-connected windings. It is a requirement of the winding arrangement, for parallel connection, that the star-connected and delta-connected windings are spaced apart by approximately 30° electrically, in order to avoid circulating currents.

For the alternative series connection of the star-connected and delta-connected windings, such circulating currents cannot flow and the strict requirement of electrical spacing does not apply. It is sufficient for the e.m.f.'s of the star-connected and delta-connected winding sections to be displaced by substantially 30° electrically for the second pole-number, 10-poles or 14-poles in these examples, so that the resultant winding factor is not seriously reduced.

When the two 6-slot winding components are connected in the same sense, as shown in line (iv), the two 2-pole m.m.f. components are additive. The 10-pole and 14-pole m.m.f. harmonics, of the two winding components, neutralise each other. The lowest Orders of residual harmonics are the 11th and 13th and both are of small magnitude.

The resultant 12-slot winding when connected in either parallel or series star-delta arrangement and fed from a balanced 3-phase supply sets up, in effect, a 12-phase distribution of ampere-conductors. It is the best possible distribution which can be achieved in 12 slots. The distribution (or layer) factor is unity at each pole number and the series of harmonics produced is of orders $p \pm 12k$ where p is the basic pole-pair number and k is any positive integer. All harmonics other than slot harmonics are zero.

With the alternative connection of FIG. 1 (c), the two 6-slot winding components are connected in opposite sense, those phase-winding sections under the modulation wave of FIG. 2 (v) being reversed. In this connection the 2-pole m.m.f. components and the 11th and 13th harmonics of the two 6-slot winding components neutralise each other. The 10-pole and 14-pole harmonics are additive in the two winding components and both are present in the resultant m.m.f. field, for the reason that that slot spacing which represents 30° electrical for 2-poles represents 150° spacing for 10-poles and 210° spacing for 14-poles.

The 12-slot winding component of FIG. 2 is not of practical use in itself, since both modulated pole-numbers are present in the modulated connection.

By way of explanation, it may be noted that, for most known P.A.M. pole-number changing, three-phase windings, one of the modulated pole-number components is eliminated in the resultant three-phase field by reason of the relative electrical spacing of the modulated components in the three-phase field. The three-phase winding of FIG. 2 is not such a case, because the 10-pole and 14-pole m.m.f.'s are both slot-harmonics and thus cannot be eliminated from a 12-slot winding, although it is a three-phase winding.

However, a pair or pairs of 12-slot winding components can be combined as the stator winding of a practical machine as will be shown by the two examples which follow.

EXAMPLE 1

FIG. 3 is the winding diagram of a 2-pole/10-pole, three-phase winding in 24 slots, comprising two 12-slot winding elements according to FIG. 2, combined in a single stator so as to minimise the 14-pole component.

The two 12-slot elements, arranged, dimensioned in respect of coil turns and coil conductor size and switched as shown in FIG. 2, are interleaved at 5 slots spacing, without change of sign, to form the required 24-slot stator.

The chosen spacing of 5 slots corresponds to 75° electrical spacing for 2-poles in 24 slots, corresponds to 375°, that is 15°, spacing for 10-poles and 525°, that is 165°, spacing for 14-poles. The two 10-pole components are additive, with only 15° error and the two 14-pole components almost neutralise each other.

It is not possible to form the winding of FIGS. 2 and 3 into a concentric winding and hence a uniform coil pitch is to be chosen. A coil pitch of 7 slots throughout, slot 1 to slot 8 and so on, is equal to 2.91 pole-pitches for 10-poles and provides a high winding factor for that pole number.

The lower pole-number of 2-poles is provided by the parallel-(star/delta) connection, the three-phase supply being connected to terminals 2, 4 and 6 and terminals 1, 3 and 5 being joined together. The higher pole-number of 10-poles is provided by the series-(star/delta) connection, the three-phase supply being connected to terminals 1, 3 and 5 and terminals 2, 4 and 6 being isolated.

The winding factors are $W_2 = 0.629$ and $W_{10} = 0.983$. The air-gap flux-density ratio $B_2/B_{10} = 0.625$.

The 12-slot, 2-pole winding element, consists, in effect, of two 6-slot elemental three-phase windings in parallel and hence has a distribution factor of unity. The only residual harmonics are slot-harmonics for either winding, in both the connections.

The alternative connections provide opposite directions of rotation at the alternative pole-numbers, for the same supply sequence.

EXAMPLE 2

FIG. 4 is the winding diagram of a 2-pole/14-pole, three-phase winding in 24 slots, comprising two 12-slot winding elements according to FIG. 2, combined and spaced apart around a single stator so as to minimise the 10-pole component.

The two 12-slot elements, arranged, dimensioned in respect of coil turns and conductor diameter, and switched as shown in FIG. 2, are again interleaved at 5 slots spacing, but in this example with change of sign of one component.

The chosen spacing, with reversal of sign, now corresponds to 105° electrical spacing for 2-poles in 24 slots. The 10-pole components are correspondingly neutralised and the 14-pole components are now additive.

As it is not possible to form the winding of FIGS. 2 and 4 into a concentric winding, a choice may be made from two possible coil-pitches, either 5 slots throughout or 9 slots throughout. As 5 slots coil-pitch would give a very low winding factor for 2-poles, the coil-pitch of 9 slots has been chosen for the winding of FIG. 4.

The lower pole-number of 2-poles is provided by the parallel-(star/delta) connection, the three phases being connected to terminals 2, 4 and 6 and terminals 1, 3 and 5 being joined together. The higher pole-number of 14-poles is provided by the series-(star/delta) connection, the three phases being connected to terminals 1, 3 and 5 and terminals 2, 4 and 6 being isolated.

The winding factors are $W_2 = 0.483$ and $W_{14} = 0.916$. The air-gap flux-density ratio $B_2/B_{14} = 0.541$.

The alternative connections provide the same direction of rotation at the alternative pole-numbers, for the same supply sequence.

GENERAL EXAMPLES

Including the 2-pole/10-pole winding in 24 slots of Example 1 and the 2-pole/14-pole winding in 24 slots of Example 2, it will be readily understood from the Method and the Examples particularly described, that the invention may be employed to provide windings of the following alternative pole-numbers and in the following stator slot-numbers:

(i) 2-pole/10-pole in 24, 48, 72, 96, (etc.)-slots;
(ii) 2-pole/14-pole in 24, 48, 72, 96, (etc.)-slots;
(iii) 4-pole/20-pole in 48, 96, (etc.)-slots;
(iv) 4-pole/28-pole in 48, 96, (etc.)-slots;

(v) 6-pole/30-pole in 72, 144-slots;
(vi) 6-pole/42-pole in 72, 144-slots,

The examples of (i) and (ii) involve doubling, tripling, etc. the number of slots occupied by the basic 24-slot winding.

The examples of (iii) and (iv) involve duplicating the basic 24-slot, 2-pole/10-pole or 2-pole/14-pole winding in 48 slots and doubling the number of slots to 96 slots, etc.

The examples of (v) and (vi) involve triplicating the basic 24-slot, 2-pole/10-pole or 2-pole/14-pole winding in 72 slots and doubling the number of slots to 144 slots, etc.

To state the invention in its most general form, windings can thereby be designed for the combination of any two pole-numbers selected from the series: 2, 10, 14, 22, 26, 34, 38, etc.-poles, i.e., the series in which the first seven terms are 2, 10, 14, 22, 26, 34, and 38. In another embodiment, the windings can be designed for the combination of any two pole-numbers of the series wherein the first seven terms are 4, 20, 28, 44, 52, 68, and 76.

Examples of 2 pole/10 pole and 2pole/14 pole machines have been described. A 2pole/22 pole machine could be added to this group.

Other examples include 10 pole/14 pole, 10 pole/22 pole and so on pole combinations and 14 pole/22 pole, 14 pole/26 pole and so on pole combinations, and so on for higher pole-number combinations, should such be required.

Further, integral multiples of the aforesaid pole combinations can be provided by repeating a basic winding distribution the required number of times in a stator having the same required multiple number of slots. Thus, 4 pole/20 pole, 4 pole/28 pole, 6 pole/30 pole and so on pole combinations can be obtained.

We claim:

1. A pole-amplitude modulation, pole-number changing electric machine having a three-phase stator winding comprising three phase-winding sections in delta connection and three other phase-winding sections in star connection, coils of the delta-connected phase-windings and coils of the star-connected phase-windings following each other regularly and alternately around the winding periphery and pole-amplitude modulation of the combined stator winding being effected by reversal, in current-carrying sense of the series-connected phase windings relatively to the delta-connected phase-windings.

2. A pole-amplitude modulation, pole-number changing electric machine as claimed in claim 1, providing two alternative operating pole-numbers both of which are odd-numbered pairs of poles.

3. A pole-amplitude modulation, pole-number changing electric machine as claimed in claim 1, providing two alternative operating pole-numbers both of which appear in the series wherein the first seven terms are 2, 10, 14, 22, 26, 34, 38, the said series being defined by the general expression: $2 \pm 12N$, where N is zero or any integer and a negative sign of the resultant is ignored.

4. A pole-amplitude modulation, pole-number changing electric machine as claimed in claim 1, providing two alternative operating pole-numbers both of which appear in the series wherein the first seven terms are 4, 20, 28, 44, 52, 68, 76, and so forth, the said series being defined by the general expression: $(2 \pm 12N) \times 2$, where N is zero or any integer and a negative sign of the resultant is ignored.

5. A pole-amplitude modulation, pole-number changing electric machine as claimed in claim 1, the pole-number changing stator winding of which is wound in a slotted stator, comprises a star-connected part and a delta-connected part, each winding part occupying one half of the total slots of the stator, both parts being made up of the same 2-pole basic layout, with the same phase-band sequence, phase-bands of the two winding parts alternating around the stator circumference and corresponding phase-bands of the two winding parts being equally spaced-apart throughout, all stator slots being fully filled and the coils of the series-connected winding part comprising coils of $1/\sqrt{3}$ times the number of turns and $\sqrt{3}$ times the conductor cross-section of the delta-connected winding part coils.

6. A method for designing a pole-amplitude modulation, pole-number changing electric machine having a three-phase stator winding comprising star-connected and delta-connected winding sections, comprising the steps of:

selecting a slot-number "S" for a three-phase winding element where $S=12$ slots or a multiple thereof;

selecting a pole-number "P1" for the first of the alternative pole-numbers required;

designing a first three-phase winding for P1-poles in $\frac{1}{2}S$ slots;

designing a second and similar three-phase winding for P1-poles in $\frac{1}{2}S$ slots having coils with substantially $1/\sqrt{3}$ times the number of turns and conductors of substantially $\sqrt{3}$ times the cross-section area of the coils of the first winding;

combining the said first three-phase winding with said second three-phase winding in the S slots of the winding element using a phase band of each winding in a regular and alternate sequence throughout the winding section;

ensuring that the slot-spacing of corresponding phase-bands of the first and second windings corresponds substantially to 30° electrical spacing at the first pole-number, P1;

selecting one pole-number from the alternatives (P1+S)-poles and (P1−S)-poles to be the second alternative pole-number;

selecting a stator slot-number equal to NS slots, where N is a small even integer;

combining $\frac{1}{2}N$ pairs of said winding elements in the NS slots of the stator with such slot-spacing that the m.m.f. component of the other one of the said pole-number alternatives (P1+S)-poles and (P1−S)-poles, whichever one was not selected for the said second alternative pole-number, is most completely eliminated;

selecting a coil-pitch for the combined winding;

connecting the said first three phase-windings in delta-connection and connecting the second three phase-windings, at one end of each, to the delta terminals of the first windings; and providing six control leads from the delta terminals and the other ends of the second windings for providing parallel-(star/delta) and series-(star/delta) switching of the combined stator winding for providing said first pole-number and said second pole-number, respectively.

* * * * *

UNITED STATES PATENT AND TRADEMARK OFFICE
CERTIFICATE OF CORRECTION

PATENT NO. : 4,338,534
DATED : July 6, 1982
INVENTOR(S) : BROADWAY, et al

It is certified that error appears in the above-identified patent and that said Letters Patent are hereby corrected as shown below:

Column 1, line 30; column 7, line 47; and column 8, line 14; change "series-connected" to read --star connected--

Signed and Sealed this

Twelfth Day of July 1983

[SEAL]

Attest:

GERALD J. MOSSINGHOFF

Attesting Officer

Commissioner of Patents and Trademarks